No. 609,629. Patented Aug. 23, 1898.
A. J. ROBINSON.
BALL COCK.
(Application filed Oct. 18, 1897.)
(No Model.)
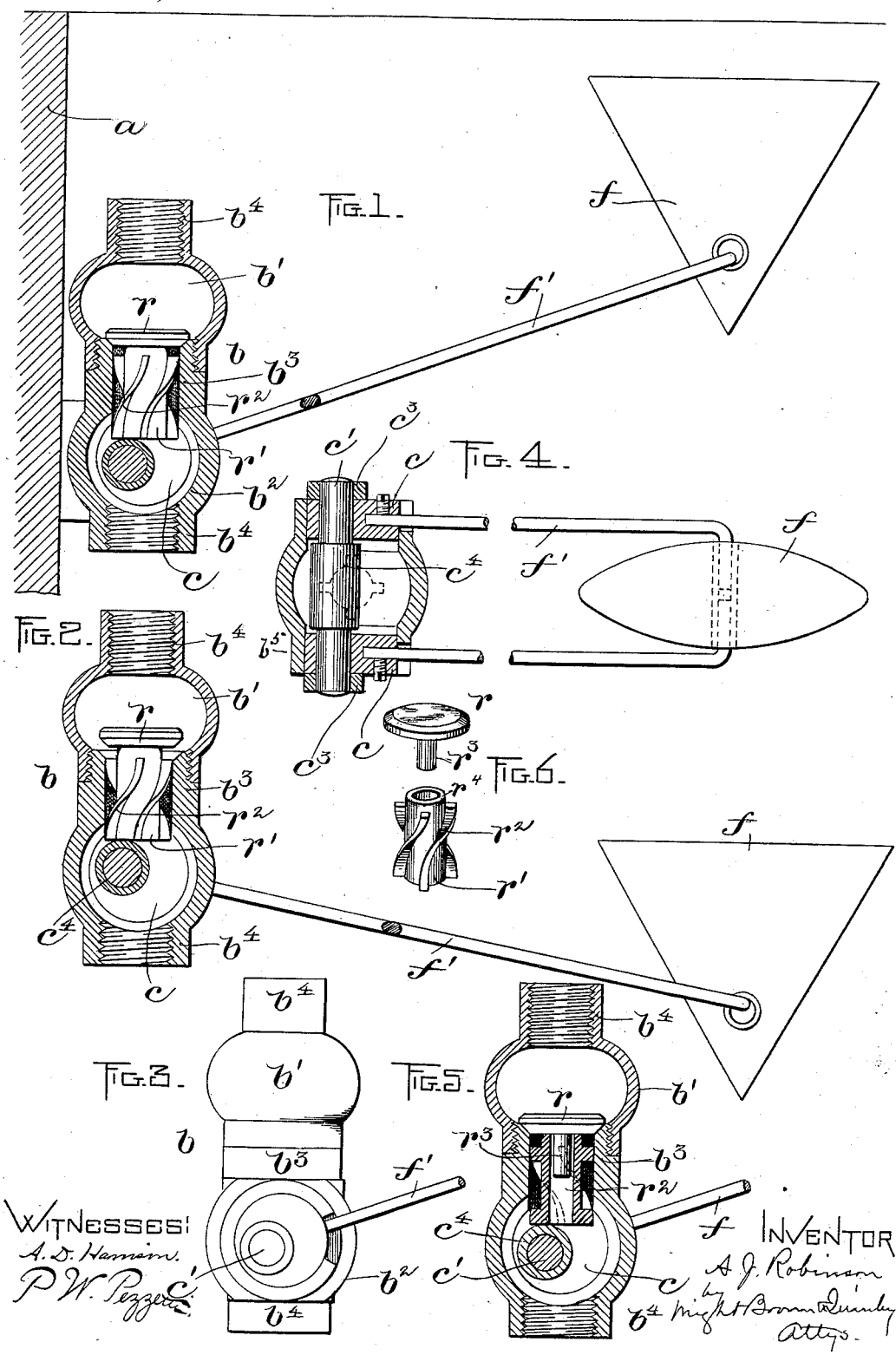

UNITED STATES PATENT OFFICE.

ANDREW J. ROBINSON, OF BOSTON, MASSACHUSETTS.

BALL-COCK.

SPECIFICATION forming part of Letters Patent No. 609,629, dated August 23, 1898.

Application filed October 18, 1897. Serial No. 655,592. (No model.)

*To all whom it may concern:*

Be it known that I, ANDREW J. ROBINSON, of Boston, in the county of Suffolk and State of Massachusetts, have invented certain new and useful Improvements in Ball-Cocks, of which the following is a specification.

This invention relates to a new and useful improvement in ball-cocks; and it consists in the novel features of construction and relative arrangement of parts hereinafter fully described in the specification, clearly illustrated in the drawings, and particularly pointed out in the claims.

Reference is to be had to the accompanying one sheet of drawings, forming a part of this application, in which like characters indicate like parts wherever they occur.

Figure 1 represents in side elevation a ball-cock mechanism embodying my invention, the parts of the ball-cock being shown in section and the valve thereof closed, with the float in its raised position. Fig. 2 represents a like view showing the valve open and the float in its depressed position. Fig. 3 represents a side elevation of the ball-cock. Fig. 4 represents a longitudinal section thereof. Fig. 5 represents a vertical section thereof. Fig. 6 represents a detail view of the valve and its sleeve.

Referring to the drawings, in the best embodiment of my invention known to me, $a$ represents the side wall of the tank, to which the ball-cock $b$ is attached in any desired way. The ball-cock in the form here shown comprises a casing inclosing the mechanism. The casing is cast to form two spherical chambers $b'$ $b^2$, connected by the cylindrical passage-way $b^3$. The casing is here shown as formed of two parts secured together, but may be formed in any preferred way. Each chamber terminates in a neck $b^4$, screw-threaded upon its inner wall for attachment to the pipes in the usual way. The opposite walls forming the chamber $b^2$ are formed with annular extensions $b^5$, in each of which is mounted a disk $c$, the walls of the annular extensions serving as bearings for the disks.

$c'$ represents a spindle arranged crosswise of the chamber $b^2$ and a little to one side of the center of the said chamber, the ends of the spindle being loosely arranged in complemental-shaped openings in the disk, these openings being at one side of the center of the disk.

$c^3$ represents washers or nuts arranged upon the ends of the spindle on the exterior of the disks to maintain the parts in proper position.

$f$ represents a float connected by arms $f'$ to each of the disks $c$, the arms playing in a recess in the ends of the annular extensions in which the disks are arranged. These recesses are of sufficient size to allow the desired play or the movement of the arms. From this construction it will be clear that as the arms are moved up and down a rotary motion will be communicated to the disks $c$, and, since the spindle $c'$ is beyond the axis of these disks, the said spindle will be correspondingly raised and lowered.

$c^4$ represents a sleeve loosely mounted upon the spindle $c$ within the chamber $b^5$, as shown.

$r$ represents a valve arranged in the chamber $b'$ and adapted to be seated upon a suitably-shaped part of the interior walls of the casing. The stem $r'$ of the valve is here shown as provided with spiral blades $r^2$, running longitudinally of said stem and bearing against the interior wall of the passage-way $b^3$. The lower end of this stem rests upon the sleeve $c^4$. When the valve is raised, as in the form shown in Fig. 2, the water passing from the chamber $b'$ to the chamber $b^2$ engages the spiral blades and gives to said stem a movement of rotation, thereby causing the stem and its blades to change their position with each movement of the valve, whereby the abrasion of the interior walls of the neck $b^3$ is made uniform. Since the spindle $c'$ is loosely mounted in the disk $c$ and the sleeve $c^4$ loosely mounted upon the spindle $c'$, it follows that practically all friction between the mechanism for opening the valve and the valve is eliminated, the spindle and sleeve constituting an antifriction device. It is obvious that the particular means here shown may be varied and embodied in many forms without departing from the spirit and scope of my invention.

In Figs. 5 and 6 the spindle, instead of being made integral with the valve, is formed as a hollow sleeve, the valve being provided with a projection $r^3$, loosely arranged in the sleeve and resting upon an extension $r^4$ of the sleeve, above the ends of the spiral blades.

By this construction the valve will automatically adjust itself to its seat in case of any binding or failure of fit between the blades and the walls of the neck, the valve rocking on the top of the extension $r^4$. The float $f$ may be of the form shown in Figs. 1 and 2, or of the form shown in Fig. 4, or any preferred form; but in all cases the ends of the arms $f$ will be connected loosely to the float in order to allow for a slight vertical movement of the float independent of the arms. This may be accomplished by arranging the arm in the slots, as here shown, or in any preferred way. By reason of this loose construction the arms are relieved from any motion of the float in its raised position due to any disturbance of the water in the tank, the float merely moving up and down slightly, while the ends of the arms play in the slots. This construction, it will be seen, relieves the valve when the tank is full of all pressure, tending to open it, and submits it to the control of the water-pressure exclusively, thereby avoiding pounding and like objections and defects.

It will be seen from the inspection of Figs. 1 and 2 that when the float is in its raised position the ends of the arm $f'$ are near the lower end of the slot and that the float must descend an appreciable distance before it has an operative engagement with the arms to move the disks, while when the float is depressed the position of the ends of the arms in relation to the ends of the slots is reversed. By connecting the arms in the manner I have described to the form of float shown in Figs. 1 and 2 I not only accomplish the ends already stated, but I also provide for a self-righting float. Either form of float may be weighted in order to compensate for varying pressures of the water.

Having thus explained the nature of my invention and described a way of constructing and using the same, though without attempting to set forth all of the forms in which it may be made or all of the modes of its use, I declare that what I claim is—

1. A valve-stem provided with one or more spiral members, and a valve member loosely carried by said stem, the spiral members terminating below the end of the stem, for the purpose set forth.

2. A valve-stem provided with one or more peripheral flanges adapted to engage the walls of the casing in which said stem is loosely arranged, and a valve member having a part loosely arranged in said stem.

3. A ball-cock comprising in its construction a casing, a valve mounted therein, a spindle, a loose member carried by said spindle and adapted to engage said valve, eccentrics mounted in said casing, the ends of said spindle being loosely arranged in said eccentrics, and means, as a float, connected to said eccentrics for operating the latter.

In testimony whereof I have signed my name to this specification, in the presence of two subscribing witnesses, this 9th day of October, A. D. 1897.

ANDREW J. ROBINSON.

Witnesses:
C. F. BROWN,
A. D. HARRISON.